US009073186B2

(12) United States Patent
Kusakawa

(10) Patent No.: US 9,073,186 B2
(45) Date of Patent: Jul. 7, 2015

(54) ELECTRIC POWER TOOL

(75) Inventor: Takuya Kusakawa, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 302 days.

(21) Appl. No.: 13/601,185

(22) Filed: Aug. 31, 2012

(65) Prior Publication Data

US 2013/0049643 A1 Feb. 28, 2013

(30) Foreign Application Priority Data

Aug. 31, 2011 (JP) ................................ 2011-189011

(51) Int. Cl.

| | |
|---|---|
| ***H02K 17/32*** | (2006.01) |
| ***B25B 21/00*** | (2006.01) |
| ***B25F 5/00*** | (2006.01) |
| ***B25B 23/147*** | (2006.01) |

(52) U.S. Cl.

CPC . *B25B 21/00* (2013.01); *B25F 5/00* (2013.01); *B25B 23/147* (2013.01)

(58) Field of Classification Search

USPC .......... 318/599, 400.07, 400.15, 400.22, 430, 318/432, 434, 635, 811

See application file for complete search history.

(56) References Cited

U.S. PATENT DOCUMENTS

| | | | | |
|---|---|---|---|---|
| 7,770,658 | B2 * | 8/2010 | Ito et al. | 173/1 |
| 2004/0217727 | A1 * | 11/2004 | Gilmore | 318/599 |
| 2006/0220605 | A1 | 10/2006 | Funabashi et al. | |
| 2009/0014192 | A1 | 1/2009 | Ito et al. | |
| 2009/0051306 | A1 * | 2/2009 | Matsunaga et al. | 318/434 |
| 2010/0307782 | A1 | 12/2010 | Iwata et al. | |
| 2011/0181215 | A1 | 7/2011 | Nakagawara | |

FOREIGN PATENT DOCUMENTS

| | | | | |
|---|---|---|---|---|
| CN | 101372095 | A | | 2/2009 |
| CN | 101171101 | B | | 12/2010 |
| EP | 2 027 974 | A2 | | 2/2009 |
| JP | 2004096824 | A | * | 3/2004 |
| JP | A-2006-281404 | | | 10/2006 |
| JP | 2007015436 | A | | 1/2007 |
| JP | 2009190118 | A | | 8/2009 |
| JP | 2011155802 | A | | 8/2011 |

OTHER PUBLICATIONS

Dec. 24, 2014 Office Action issued in Japanese Application No. 2011-189011.

Aug. 18, 2014 Notification of the First Office Action issued in Chinese Patent Application No. 201210320328.2 (with English translation).

* cited by examiner

*Primary Examiner* — Kawing Chan
*Assistant Examiner* — Jorge L Carrasquillo
(74) *Attorney, Agent, or Firm* — Oliff PLC

(57) ABSTRACT

An electric power tool includes a motor, a current detection unit, an operating portion, a current threshold setting unit and a control unit. The current threshold setting unit sets a current threshold so as to change in accordance with changes in a motor current which flows when the motor is started as usual until a predetermined period of time elapses since the control unit has started driving of the motor. When the predetermined period of time has elapsed, the current threshold setting unit fixes the current threshold to a constant value which corresponds to a set torque.

20 Claims, 9 Drawing Sheets

FIG. 8

| SET TORQUE | UPDATE VALUE β | UPDATE VALUE γ | CURRENT THRESHOLD (FINAL VALUE) |
|---|---|---|---|
| 1 | 1 | 1 | 20 |
| 2 | 1 | 1 | 40 |
| 3 | 2 | 2 | 60 |
| 4 | 2 | 2 | 80 |
| 5 | 3 | 3 | 100 |
| 6 | 4 | 3 | 120 |
| 7 | 5 | 4 | 140 |
| 8 | 7 | 5 | 160 |
| 9 | 9 | 7 | 200 |

ELECTRIC POWER TOOL

CROSS-REFERENCE TO RELATED APPLICATIONS

This application claims the benefit of Japanese Patent Application No. 2011-189011 filed Aug. 31, 2011 in the Japan Patent Office, the disclosure of which is incorporated herein by reference.

BACKGROUND

The present invention relates to an electric power tool provided with a motor which rotationally drives a rotational shaft which mounts a tool element.

An electric power tool of so-called electronic clutch type has been known. This type of electric power tool is configured to stop driving of a motor when rotational torque of a rotational shaft which mounts a tool element such as a driver bit exceeds a predetermined set torque.

This type of electric power tool is usually configured to set a current threshold in accordance with the set torque and, when a motor current reaches the current threshold, determines that the rotational torque of the rotational shaft has reached the set torque and stop driving of the motor.

The motor current Im can be described as below when V is a power supply voltage, E is a back-electromotive force generated upon driving the motor, and R is a resistance of an armature winding.

$$Im=(V-E)/R$$

When the motor starts driving, the back-electromotive force E=0, since a rotor is in a stationary state.

As a result, immediately after the motor starts driving, the motor current temporarily exceeds the current threshold. If the motor current is limited to be equal to or lower than the current threshold from immediately after the motor starts driving, driving of the motor cannot be continued.

For example, the electric power tool of electronic clutch type disclosed in Japanese Unexamined Patent Application Publication No. 2006'281404 is configured not to stop driving of the motor even if the motor current exceeds the current threshold unless such state continues for a predetermined period of time or more.

In other words, after the motor starts driving, the function of electronic clutch is stopped for a fixed time, so that the driving of the motor can continue.

SUMMARY

However, a load applied to the rotational shaft when the motor starts driving is not constant, and varies depending on conditions of use of the electric power tool.

For this reason, if the function of electronic clutch is stopped for a certain period of time after the motor starts driving as in the aforementioned electric power tool, the rotational torque of the rotational shaft may become significantly large when the function is stopped. A workpiece or the electric power tool itself may be damaged by the electric power tool.

For example, if the electric power tool is an electric driver which fastens screws by a driver bit mounted on the rotational shaft, start of driving of the motor may sometimes result in turning screws from the beginning, or retightening screws of which fastening an object to be fastened has been substantially completed.

Upon retightening the screws, the rotational torque of the rotational shaft (i.e., fastening torque of the screw) significantly increases from immediately after the motor starts driving.

Therefore, if the function of the electronic clutch is stopped for a certain period of time after the motor starts driving under such conditions of use, the screws cannot be fastened with an appropriate torque which is equal to or lower than the set torque. The screws or an object to be fastened by the screw, or the electric power tool itself may be damaged.

In one aspect of the present invention, it is desirable to be able to provide an electric power tool which can limit the rotational torque of the rotational shaft to be equal to or lower than the set torque from immediately after the motor starts driving.

An electric power tool of the invention includes a motor, a current detection unit, an operating portion, a current threshold setting unit and a control unit. The motor rotationally drives a rotational shaft which mounts a tool element. The current detection unit detects a motor current flowing through the motor. The operating portion is operated to input a command for driving the motor. The current threshold setting unit sets a current threshold which is an upper limit of the motor current, in accordance with a predetermined set torque. The control unit drives the motor in accordance with an amount of operation of the operating portion, and stops driving of the motor when the motor current detected by the current detection unit reaches the current threshold set by the current threshold setting unit. The current threshold setting unit sets the current threshold so as to change in accordance with changes in the motor current which flows when the motor is started as usual until a predetermined period of time elapses since the control unit has started driving of the motor. When the predetermined period of time has elapsed, the current threshold setting unit fixes the current threshold to a constant value which corresponds to the set torque.

Therefore, according to the electric power tool of the invention, even if the rotational torque of the rotational shaft exceeds the set torque by an external load applied to the rotational shaft immediately after start of driving of the motor, it is possible to detect that the rotational torque exceeds the set torque, based on the motor current and the current threshold, thereby to stop driving of the motor.

Therefore, according to the electric power tool, as compared to the aforementioned electric power tool in the background art, the motor (and a tool element mounted on the rotational shaft) can be driven more safely.

Here, the current threshold set within the predetermined period of time immediately after start of driving the motor may be set to vary in accordance with the motor current which flows when the motor is started as usual.

The motor current which flows when the motor is started as usual temporarily becomes larger than the motor current when the rotation of the motor is stable after start of the motor. Thus, the current threshold setting unit may be configured as below.

Particularly, the current threshold setting unit may set the current threshold in such a manner that a maximum value of the current threshold is larger than a constant value which is set after elapse of the predetermined period of time, within the predetermined period of time immediately after start of driving of the motor.

In this case, the current threshold immediately after start of driving of the motor can be set in accordance with changes in the motor current when the motor rotates normally.

Also, in order to make the current threshold setting unit set the current threshold within the predetermined period of time in this way, variation patterns of the current threshold may be set in advance, for example, based on variation patterns of the motor current which flows when the motor is started as usual.

In other words, when setting the current threshold within the predetermined period of time immediately after start of driving of the motor, the current threshold setting unit may use the variation patterns set in advance to set the current threshold.

The control unit may include a drive circuit and a duty ratio setting unit. The drive circuit rotates the motor by driving a switching element provided in a current-carrying path to the motor.

In addition, the duty ratio setting unit sets a target duty ratio in accordance with the amount of operation of the operating portion, and gradually increases up to the target duty ratio a drive duty ratio used by the drive circuit to drive the switching element, thereby to increase a rotational speed of the motor.

In this case, when the duty drive ratio set by the duty ratio setting unit increases toward the target duty ratio, the current threshold setting unit may gradually increase the current threshold.

In other words, if the motor rotates normally when the duty ratio setting unit increases the drive duty ratio after start of driving of the motor, the motor current increases in accordance with the increase of the drive duty ratio, and thus the rotational speed also increases.

According to the electric power tool configured as above, the current threshold varies in accordance with changes in the motor current when the motor is started as usual. By comparing the current threshold and the motor current, false detection of a starting current is inhibited and abnormal rotational torque can be accurately detected.

The current threshold setting unit, when the drive duty ratio set by the duty ratio setting unit reaches the target duty ratio, may gradually decrease the current threshold.

In addition, the current threshold setting unit, when the current threshold is gradually decreased to be equal to the constant value which corresponds to the set torque, may determine that the predetermined period of time has elapsed, and fix the current threshold to the constant value.

In this case, when the drive duty ratio set by the duty ratio setting unit reaches the target duty ratio, and the drive duty ratio is fixed to the target duty ratio, the motor comes into a constant speed state from an acceleration state. The motor current comes into a stable state which corresponds to the target duty ratio.

In the electric power tool as such, when the drive duty ratio set by the duty ratio setting unit reaches the target duty ratio, the current threshold is gradually decreased to be changed to a value which corresponds to the motor current.

Therefore, the electric power tool as such can vary the current threshold within the predetermined period of time immediately after start of driving of the motor, in accordance with the motor current which actually flows when the motor is started as usual, and, based on the current threshold, accurately determine abnormal torque immediately after start of driving of the motor while inhibiting false detection of the starting current.

The electric power tool may include a torque setting portion that enables setting any torque as the set torque by external operation.

In this case, the current threshold setting unit may change a rate of change per unit time of the current threshold within the predetermined period of time to be larger as the set torque is larger, in accordance with the set torque which is set via the torque setting portion.

In the electric power tool as such, the current threshold for use in determining whether or not to stop driving of the motor within the predetermined period of time immediately after start of driving of the motor can be set to be larger, as the set torque is larger, in accordance with the set torque.

The electric power tool as such can inhibit the rotational torque of the rotational shaft from exceeding the set torque immediately after start of driving of the motor in a more favorable manner.

In addition, the current threshold setting unit may temporarily increase the current threshold when the amount of operation of the operating portion increases.

In this case, when the amount of operation of the operating portion increases and the motor current increases, it is possible to inhibit the motor current from temporarily exceeding the current threshold thereby to stop driving of the motor.

The duty ratio setting unit, when the drive duty ratio reaches the target duty ratio, may update the drive duty ratio in such a manner that the rotational speed of the motor becomes a target rotational speed which is set in accordance with the amount of operation of the operating portion.

In this case, when and after the drive duty ratio has reached the target duty ratio after start of driving of the motor, the tool element mounted on the rotational shaft (and the workpiece) can be driven at a constant rotational speed.

BRIEF DESCRIPTION OF THE DRAWINGS

The present invention will now be described below by way of example, with reference to the accompanying drawings in which:

FIG. 8 is an explanatory diagram showing a map for threshold setting used to execute the threshold setting process.

DETAILED DESCRIPTION OF THE PREFERRED EMBODIMENTS

An electric power tool of the present embodiment performs a predetermined processing (for example, fastening of screws to an object to be fastened) on a workpiece through a tool bit as a tool element (driver bit, for example) by rotating a rotational shaft which mounts the tool bit.

Figure 1:
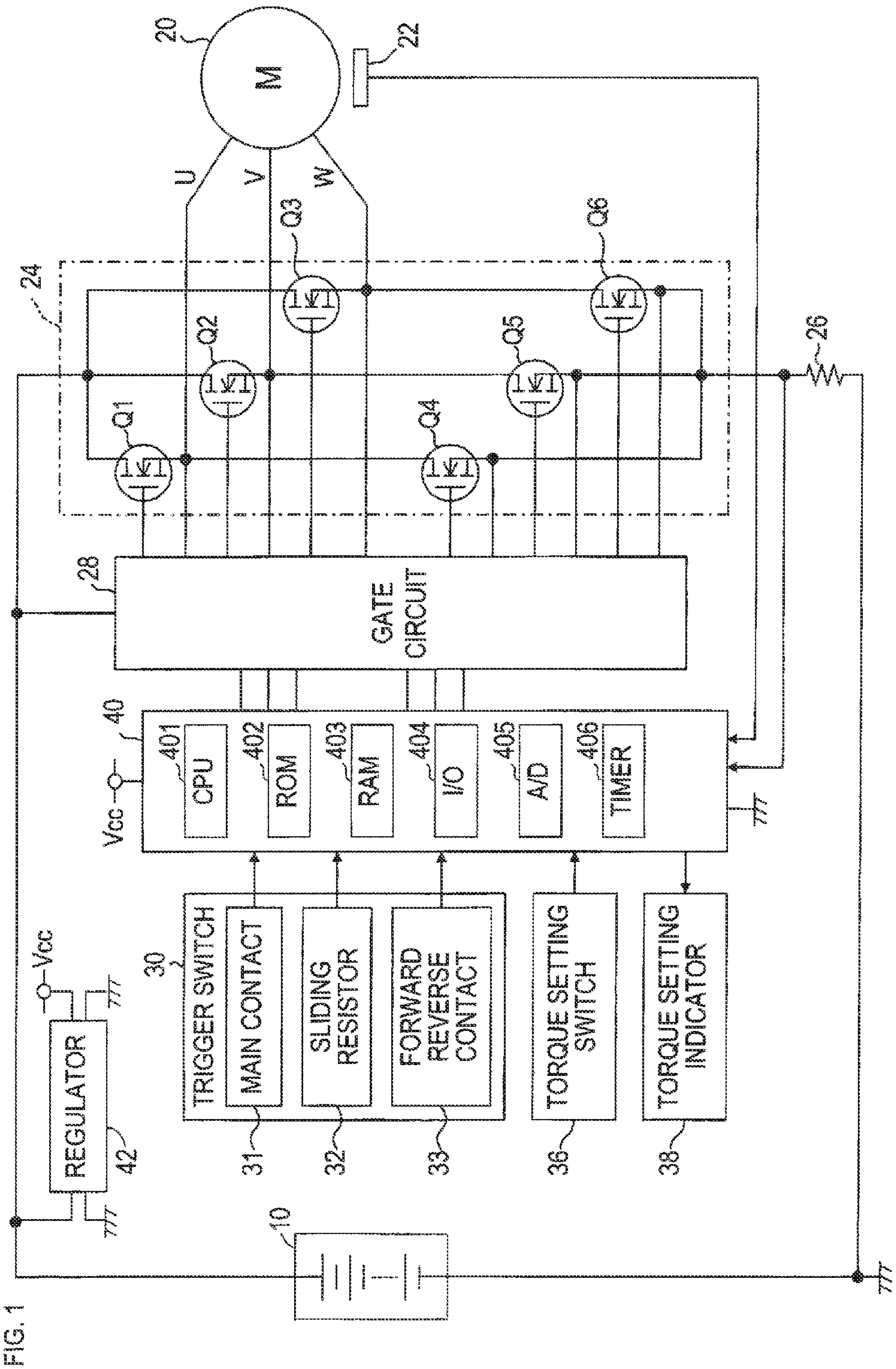
FIG. 1 is a block diagram showing a configuration of an entire drive system of an electric power tool according to an embodiment.

FIG. 1 shows a configuration of an entire drive system which is housed within or attached to a housing body (not shown) of the electric power tool to be used for rotationally driving the rotational shaft.

As shown in FIG. 1, the electric power tool includes a three-phase brushless DC motor as a motor 20 which rotates the rotational shaft. The electric power tool also includes a battery pack 10, a motor drive circuit 24, a gate circuit 28, and a controller 40 as drive units that drive control the motor 20.

The battery pack 10 is configured by housing a plurality of secondary battery cells connected in series inside a casing which can be detachably attached to the housing body of the electric power tool.

The motor drive circuit 24 receives power supply from the battery pack 10 to flow an electric current to each phase winding of the motor 20. The motor drive circuit 24 includes six switching elements Q1 to Q6 constituted respectively of a FET.

In the motor drive circuit 24, the switching elements Q1 to Q3 are provided as so-called high-side switches between each terminal U, V, W of the motor 20 and a power supply line connected to a positive electrode side of the battery pack 10.

The switching elements Q4 to Q6 are provided as so-called low-side switches between the each terminal U, V, W of the motor 20 and a ground line connected to a negative electrode side of the battery pack 10.

Next, the gate circuit 28 in accordance with control signals outputted from the controller 40, turns on/off the switching elements Q1 to Q6 inside the motor drive circuit 24 to flow an electric current through each phase winding of the motor 20, thereby to rotate the motor 20.

The controller 40 of the present embodiment is configured as a one-chip microcomputer which includes at least a CPU 401, a ROM 402, a RAM 403, an I/O port 404, an A/D converter 405, and a timer 408. In the controller 40 configured as such, the CPU 401 executes later-explained various processes according to various programs stored in the ROM 402.

More particularly, the controller 40, in accordance with a drive command from the trigger switch 30, sets a drive duty ratio of the switching elements Q1 to Q6 which constitute the motor drive circuit 24. The controller 40 outputs to the gate circuit 28 control signals in accordance with the drive duty ratio to rotationally drive the motor 20.

The trigger switch 30 is a switch for inputting a command for driving the electric power tool. The trigger switch 30 is operated by a user of the electric power tool. The trigger switch 30 is provided in the housing body of the electric power tool together with a torque setting switch 36 and a torque setting indicator 38.

The trigger switch 30 includes a main contact 31, a sliding resistor 32 and a forward reverse contact 33. The main contact 31 is a contact which is turned on when the trigger switch 30 is operated by a user. The sliding resistor 32 is a resistor of which resistance value varies in accordance with a pulling amount (i.e., amount of operation) of the trigger switch 30 by the user. The forward reverse contact 33 is a contact for receiving a command for switching a rotational direction from the user.

The torque setting switch 36 is a switch for the user to set by manual operation an upper limit of rotational torque of the rotational shaft (for example, tightening torque by the tool bit). The torque setting switch 36 is connected to the controller 40.

The torque setting indicator 38 is an indicator for displaying set torque which is set via the torque setting switch 36. In the present embodiment, the torque setting indicator 38 includes a plurality of LEDs, and is configured to display the set torque by the LEDs.

The torque setting indicator 38 is also connected to the controller 40. The controller 40 controls the torque setting indicator 38 to cause the torque setting indicator 38 to display the set torque. In the present embodiment, the controller 40 controls a number of lighted LEDs or lighting patterns of the LEDs in the torque setting indicator 38, thereby causing the set torque to be displayed.

Next, the motor 20 includes a rotational position sensor 22 for detecting a rotational speed and a rotational position of the motor 20. In addition, in a current-carrying path to the motor 20 that is formed via the motor drive circuit 24 from the battery pack 10, a resistor 26 is provided for detecting a motor current flowing through the motor 20.

A detection signal from the rotational position sensor 22 and a detection signal of the motor current from the resistor 26 are respectively inputted to the controller 40.

In addition, a regulator 42 is provided inside the housing body of the electric power tool. The regulator 42 receives power supply from the battery pack 10 to generate the constant power supply voltage Vcc (for example, DC 5V) which is in turn supplied to the controller 40.

Next, a control process will be described along the flowcharts shown in FIGS. 2 to 6, which is executed by the controller 40 (more particularly. CPU 401) in order to rotationally drive the motor 20 in accordance with a drive command from the trigger switch 30.

The control process is a process repeatedly executed in the controller 40, when the power supply voltage Vcc is applied to the controller 40 from the regulator 42.

Figure 2:
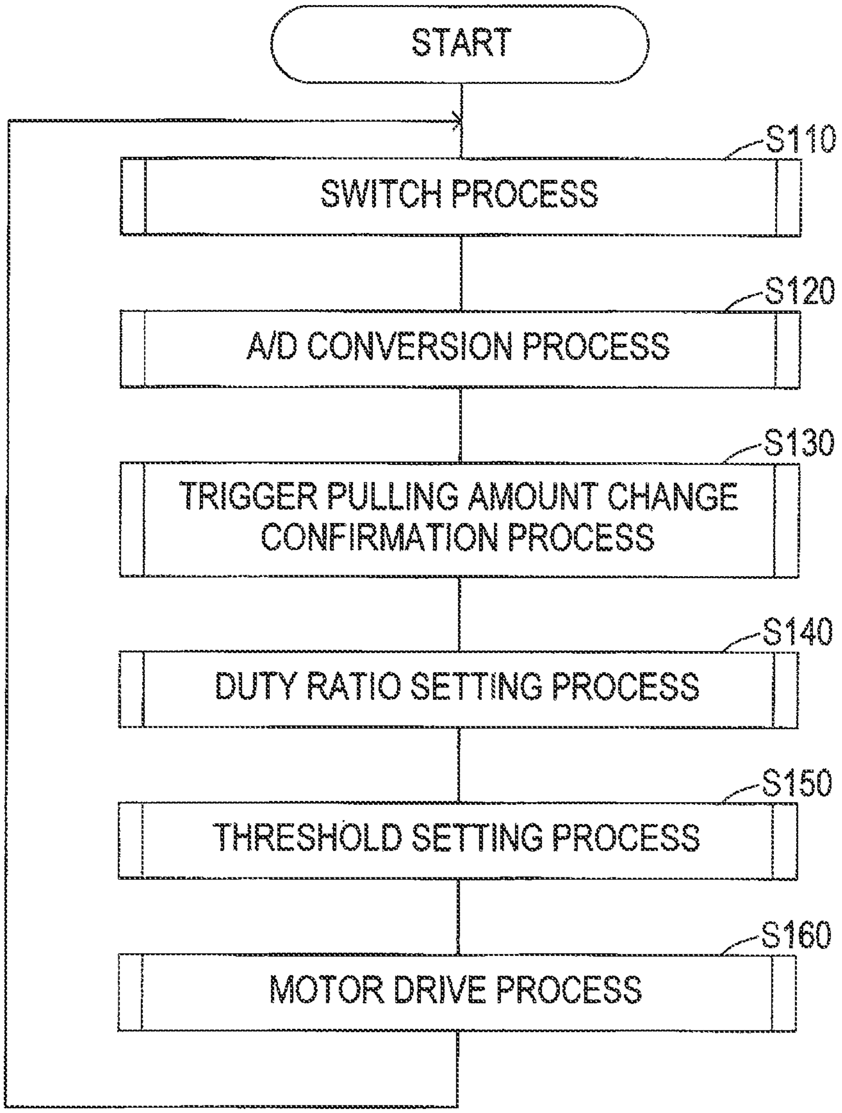
FIG. 2 is a flowchart showing a series of control process executed in a controller.

As shown in FIG. 2, the controller 40, when the control process is started, first executes a switch process in S110 (S represents a step). In the switch process, a state of the main contact 31 of the trigger switch 30 and an operational state of the torque setting switch 36 are identified.

More particularly, in the switch process, the set torque is identified from the operational state of the torque setting switch 36 and displayed on the torque setting indicator 38.

In addition, in the switch process, when the main contact 31 of the trigger switch 30 is in an off-state, an initialization process is simultaneously performed in which various flags used for control are cleared and a current threshold which is an upper limit of the motor current is initialized to a value "0".

Then, in S120, an A/D conversion process is executed. In the A/D conversion process, a resistance value of the sliding resistor 32 of the trigger switch 30 and a voltage between both ends of the resistor 26 for detection of the motor current are retrieved via the A/D converter 405 inside the controller 40, so that the pulling amount of the trigger switch 30 (hereinafter referred to as a trigger pulling amount) and the motor current are identified.

Figure 3:
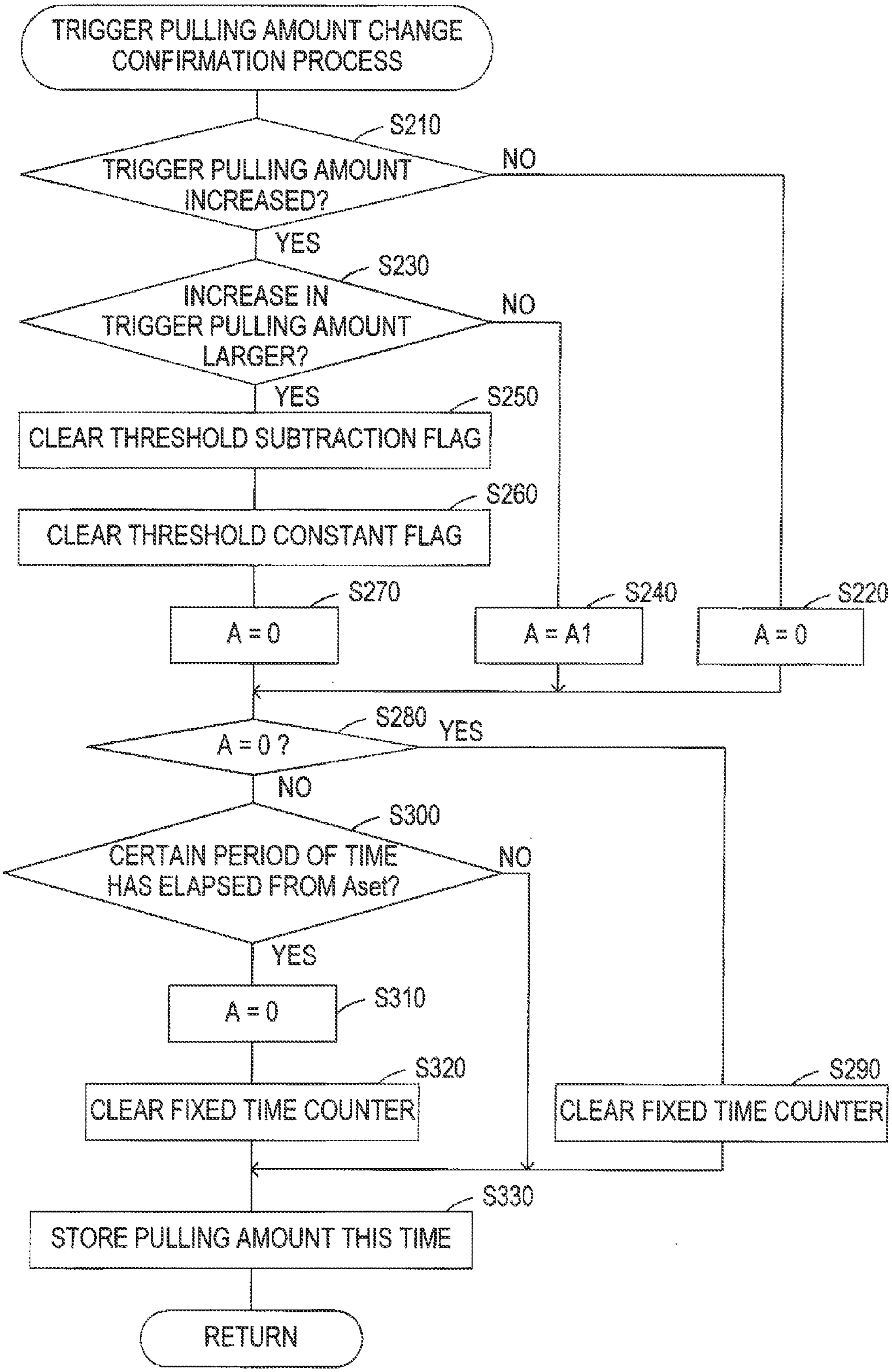
FIG. 3 is a flowchart showing a trigger pulling amount change confirmation process executed in S130 of FIG. 2.
Figure 4:
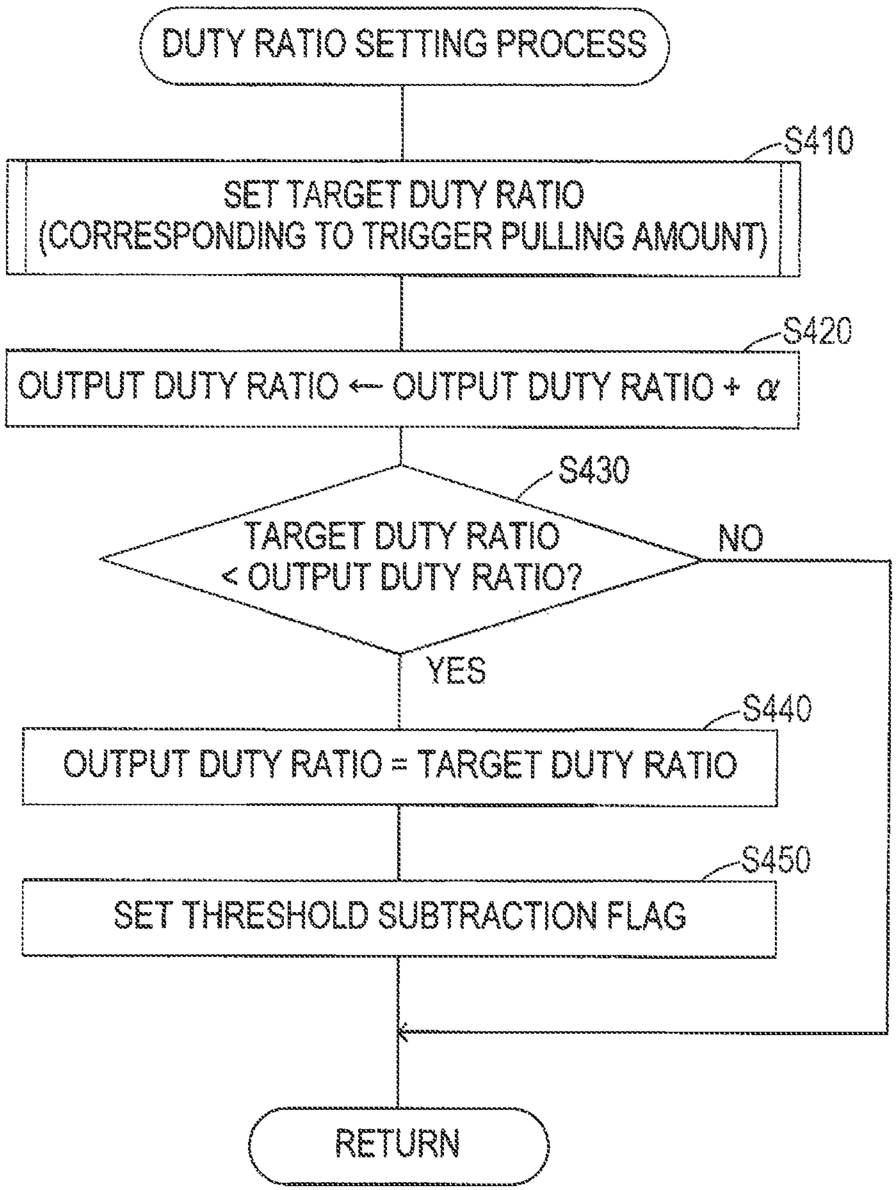
FIG. 4 is a flowchart showing a duty ratio setting process executed in S140 of FIG. 2.
Figure 5:
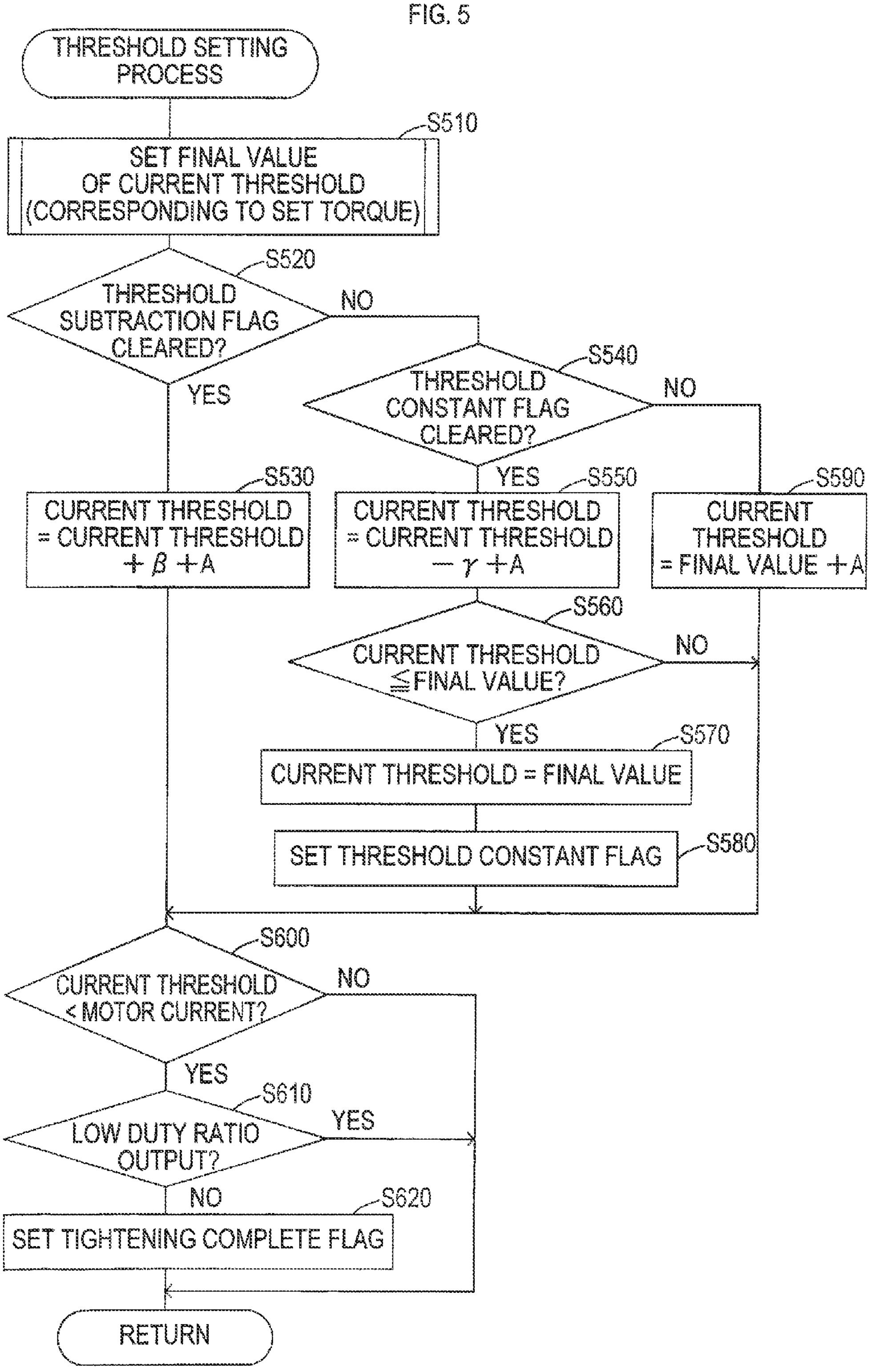
FIG. 5 is a flowchart showing a threshold setting process executed in S150 of FIG. 2.
Figure 6:
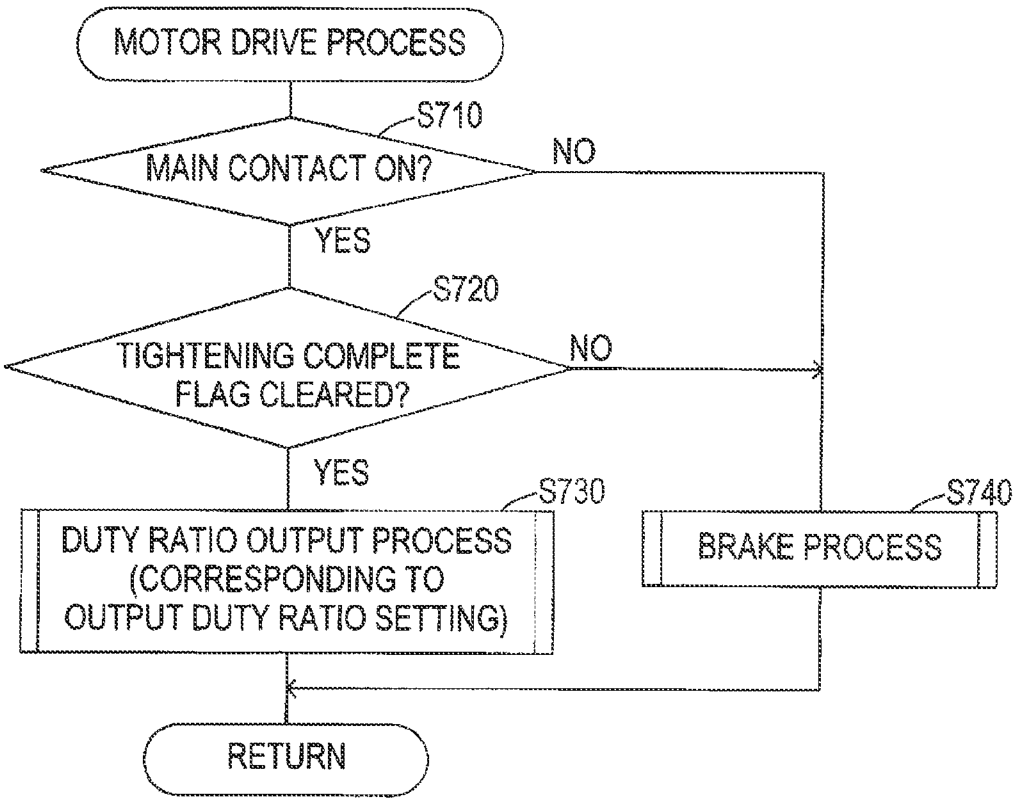
FIG. 6 is a flowchart showing a motor drive process executed in S160 of FIG. 2.

Then, in subsequent S130, a trigger pulling amount change confirmation process shown in FIG. 3 is executed. In subsequent S140, a duty ratio setting process shown in FIG. 4 is executed. In subsequent S150, a threshold setting process shown in. FIG. 5 is executed. In subsequent S160, a motor drive process shown in FIG. 6 is executed. After the motor drive process in S160 is executed, the process returns to S110.

The trigger pulling amount change confirmation process executed in S130 is a process for setting a correction value A used to update the current threshold when it is determined whether or not the trigger pulling amount identified in S120 has increased and that the trigger pulling amount has increased.

As shown in FIG. 3, in the trigger pulling amount change confirmation process, it is first determined in S210 whether or not the trigger pulling amount has increased. Unless the trigger pulling amount has increased, a value "0" is set as the correction value A of the current threshold in S220.

When it is determined in S210 that the trigger pulling amount has increased, the process proceeds to S230. It is then determined whether or not the increase is larger than a predetermined increase determination value. If the increase in the trigger pulling amount is not larger than the increase determination value, a preset predetermined value A1 is set as the correction value A of the current threshold in S240.

The value A1 may be set as a constant value, or may be set as a larger value as the set torque is larger, in accordance with the set torque which is set via the torque setting switch 36.

Then, when it is determined in S230 that the increase in the trigger pulling amount is larger than the predetermined increase determination value, a threshold subtraction flag is cleared in S250, a threshold constant flag is cleared in S260, and a value "0" is set as the correction value A of the current threshold in S270.

The steps of S250 to S270 are processes for initializing each of the above flags and the correction value A, as a result of determination that the trigger switch 30 is re-operated by the user to input a command for driving when the increase in the trigger pulling amount is larger than the increase determination value.

As above, after the step of S220, S240, or S270 is executed, the process in turn proceeds to S280. In S280, it is determined whether or not a value "0" is set to the correction value A. If the correction value A=0, the process proceeds to S290.

In S290, a fixed time counter is cleared which is used to count elapsed time from when the predetermined value A1 is set as the correction value A in S240. Then, the process proceeds to S330.

When it is determined in S280 that the correction value A does not have a value "0", the process proceeds to S300. It is then determined based on a count value of the fixed time counter whether or not a certain period of time has elapsed from when the predetermined value A1 is set as the correction value A in S240.

Then, when it is determined in S300 that the certain period of time has not yet elapsed, the process immediately proceeds to S330. When it is determined in S300 that the certain period of time has elapsed, a value "0" is set to the correction value A in S310. Then, after the fixed time counter is cleared in S320, the process proceeds to S330.

In S330, in order to be able to determine the increase and the amount of increase in the trigger pulling amount in the steps of S210 and S230 next time, the trigger pulling amount this time is stored in the memory (RAM 403) inside the controller 40. The trigger pulling amount change confirmation process ends.

The aforementioned duty ratio setting process executed in S140 is a process for setting an output duty ratio used to drive each of the switching elements Q1 to Q6 inside the motor drive circuit 24 via the gate circuit 28.

As shown in FIG. 4, in the duty ratio setting process, a target duty ratio for controlling the rotational speed of the motor 20 to a rotational speed that corresponds to the trigger pulling amount is first set based on the trigger pulling amount in S410.

Then, in S420, an update process of the output duty ratio is executed. In the update process, the output duty ratio is increased by adding a predetermined update value α to the present output duty ratio (initial value: 0).

Then, in subsequent S430, it is determined whether or not the output duty ratio updated in S420 has exceeded the target duty ratio set in S410. If the output duty ratio has not exceeded the target duty ratio, the duty ratio setting process immediately ends.

On the other hand, when it is determined in S430 that the output duty ratio has exceeded the target duty ratio, the process proceeds to S440. After the target duty ratio is set as the output duty ratio, the process proceeds to S450. In S450, the threshold subtraction flag is set, and the duty ratio setting process ends.

Figure 7:
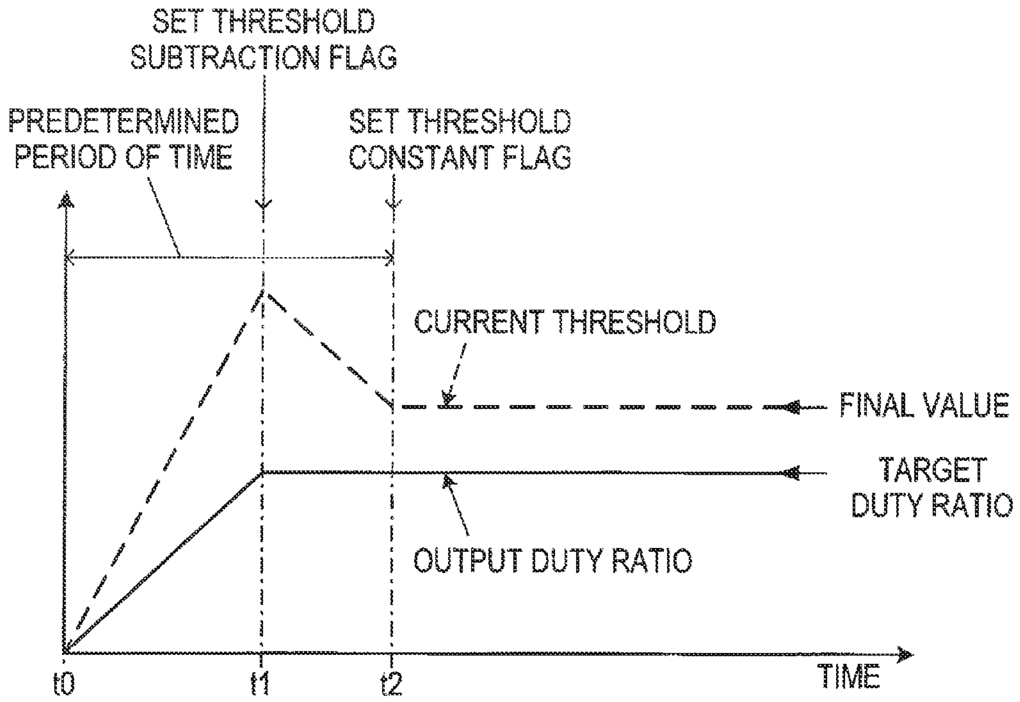
FIG. 7 is a time chart showing a drive duty ratio and a current threshold set in the duty ratio setting process and threshold setting process.

In other words, in the duty ratio setting process, as shown in FIG. 7, the target duty ratio is set in accordance with the trigger pulling amount. Then, the output duty ratio is gradually increased to the target duty ratio.

As a result, the rotational speed of the motor 20 driven through the gate circuit 28 and the motor drive circuit 24 can be increased up to the rotational speed that corresponds to the trigger pulling amount, by the later described motor drive process.

Next, the aforementioned threshold setting process executed in S150 is a process for setting the current threshold. In the threshold setting process, as shown in FIG. 7, the current threshold is set from start (time t0) of driving of the motor 20.

As shown in FIG. 5, in the threshold setting process, first in S510, a final value of the current threshold to limit the rotational torque of the rotational shaft to the set torque is set based on the set torque which is set via the torque setting switch 36 and a map shown in FIG. 8.

The final value of the current threshold is set to be larger, as the set torque is larger, based on the map shown in FIG. 8, together with later described update values β and γ.

Subsequently, in S520, it is determined whether or not the threshold subtraction flag is cleared. If the threshold subtraction flag is cleared, the process proceeds to S530. By adding the update value β and the correction value A to the presently set current threshold value: 0), the current threshold is updated (increased). The process proceeds to S600.

On the other hand, if it is determined in S520 that the threshold subtraction flag is not cleared (that is, the flag is set), the process proceeds to S540. It is then determined whether or not the threshold constant flag is cleared.

If the threshold constant flag is cleared, the process proceeds to S550. By subtracting the update value γ that is set based on the map shown in FIG. 8 from the presently set current threshold and adding the correction value A, the current threshold is updated (decreased).

The correction value A is set to the predetermined value A1 only for a certain period of time, when the pulling amount has increased in a rate of increase less than the increase determination value in the above described trigger pulling amount change confirmation process. Since a value "0" is set under otherwise conditions, the current threshold is normally updated using only the update value β or γ in S530 and S550.

In addition, these update values β and γ are not only set to be larger as the set torque is larger, based on the map shown in FIG. 8 as in the case with the final value of the current threshold, but are set in such a manner that a maximum value of the current threshold is sufficiently larger than the final value.

That is, as shown in FIG. 7, the current threshold gradually increases by the update value β from start of driving of the motor 20 at time t0 until time t1 when the threshold subtraction flag is set, and then gradually decreases by the update value γ.

Accordingly, the current threshold takes the maximum value at time t1 when the threshold subtraction flag is set. The update values β and γ which determine a rate of change per unit time of the current threshold are set such that the maximum value of the current threshold at time t1 is larger than the final value that corresponds to the set torque.

This is to be able to determine abnormal rotational torque from the motor current while false detection of a starting current is inhibited, when the motor current temporarily surges immediately after start of driving of the motor 20 by changing the current threshold in accordance with changes in the motor current when the motor 20 rotates normally, after start of driving of the motor 20.

Subsequently in S560, the current threshold updated in S550 is compared with the final value of the current threshold set in S510 to determine whether or not the current threshold is equal to or lower than the final value.

If the current threshold is equal to or lower than the final value, the final value is set as the current threshold in S570. After the threshold constant flag is set in S580, the process proceeds to S600. If the current threshold is not equal to or lower than the final value in S560, the process immediately proceeds to S600.

Subsequently, when it is determined in S540 that the threshold constant flag is not cleared (that is, the flag is set), the process proceeds to S590. After setting as the current threshold a value obtained by adding the correction value A to the final value set in S510, the process proceeds to S600.

In S600, the motor current detected through the resistor 26 is read. It is then determined whether or not the motor current has exceeded the current threshold. If the motor current has not exceeded the current threshold, the threshold setting process immediately ends.

On the other hand, if it is determined in S600 that the motor current has exceeded the current threshold, the process proceeds to S610. It is then determined whether or not the presently set output duty ratio is a low duty ratio which is equal to or lower than a predetermined duty ratio such as 10%.

If it is determined in S610 that the presently set output duty ratio is a low duty ratio, the threshold setting process immediately ends, since it is considered that, even if driving of the motor 20 continues, the rotational torque of the rotational shaft does not significantly increase.

To the contrary, if it is determined in S610 that the presently set output duty ratio is not a low duty ratio, a tightening complete flag is set in S620. Then, the threshold setting process ends.

Next, the aforementioned motor drive process executed in S160 is a process for rotationally driving the motor 20, by outputting to the gate circuit 28 control signals which correspond to the output duty ratio set in the aforementioned duty ratio setting process, when the trigger switch 30 is being operated by a user.

As shown in FIG. 6, in the motor drive process, first in S710, it is determined whether or not the main contact 31 of the trigger switch 30 is in an on-state (that is, whether or not the trigger switch 30 is being operated).

If it is determined that the main contact 31 of the trigger switch 30 is in the on-state, the process proceeds to S720. It is then determined whether or not the tightening complete flag set in S620 of the aforementioned threshold setting process is cleared.

If it is determined that the tightening complete flag is cleared, the process proceeds to S730. The motor 20 is rotationally driven by outputting to the gate circuit 28 control signals which correspond to the output duty ratio set in the duty ratio setting process. Then, the motor drive process ends.

On the other hand, if it is determined that the main contact 31 of the trigger switch 30 is not in the on-state in S710, or the tightening complete flag is not cleared (in other words, the flag is set) in S720, the process proceeds to S740.

In S740, a brake process is executed only for a certain period of time required for stopping the rotation of the motor 20, and then the motor drive process ends. In the brake process, generation of a drive force to make the motor 20 rotate is stopped and a braking force is generated in the motor 20 through the gate circuit 28 and the motor drive circuit 24.

As described above, in the electric power tool of the present embodiment, in order to suppress the rotational torque of the rotational shaft rotated by the motor 20 to be equal to or lower than the set torque which is set by the user, the current threshold which is the upper limit of the motor current is set. When the motor current exceeds the current threshold, driving of the motor 20 is stopped.

Also, limitation of the motor current by the current threshold is not performed after elapse of a certain period of time from start of driving of the motor 20 until the motor current is stabilized as before, but is performed immediately after start of driving of the motor 20.

However, a back electromotive force generated in the motor 20 becomes substantially zero immediately after start of driving of the motor 20. Thus, the motor current increases as compared at normal driving of the motor 20. Because of this, when the current threshold immediately after start of driving of the motor 20 is set in accordance with the set torque, the motor current exceeds the current threshold immediately after start of driving of the motor 20. Then, driving of the motor 20 is stopped.

Thus, in the present embodiment, as shown in FIG. 7, the current threshold is increased in a constant slope which is determined by the update value β while the output duty ratio used for drive control of the motor 20 increases (that is, from time t0 until time t1) after start of driving of the motor 20.

In addition, the current threshold is decreased in a constant slope which is determined by the update value γ at time t1 and later. When the current threshold reaches the final value which is set based on the set torque (time t2), the current threshold is fixed to the final value.

For this reason, according to the electric power tool of the present embodiment, on condition that an external load applied to the rotational shaft increases immediately after start of driving of the motor 20, for example, as in the case of retightening of screws, even if the trigger switch 30 is largely operated and the rotational torque of the rotational shaft exceeds the set torque, the increase in torque can be detected immediately using the current threshold and the motor current. Thereby, driving of the motor 20 can be stopped.

Thus, according to the present embodiment, as compared to the electric power tool in the background art, the motor 20 (and a tool element mounted on the rotational shaft) can be driven more safely.

Also, in the present embodiment, the current threshold within the predetermined period of time from time t0 to t2 shown in FIG. 7 is set not in accordance with predetermined variation patterns but in accordance with changes in the output duty ratio used for electrical conduction control of the motor 20.

For this reason, it is possible to set the current threshold within the predetermined period of time so as not to erroneously determine abnormal rotational torque, depending on the behavior of the motor 20. Control accuracy as an electronic clutch can be improved.

Also, in the present embodiment, changes in the trigger pulling amount is monitored which is the amount of operation of the trigger switch 30. When the amount of increase in the trigger pulling amount is within a predetermined range, the correction value A is added to the current threshold, so that the current threshold is temporarily increased.

For this reason, according to the electric power tool of the present embodiment, if the output duty ratio increases and the motor current increases due to the further pulling of the trigger switch 30 by the user upon rotational driving of the motor 20, the motor current can be inhibited from exceeding the current threshold to stop driving of the motor 20.

Here, in the present embodiment, the resistor 26 corresponds to an example of a current detection unit of the present invention. The trigger switch 30 corresponds to an example of an operating portion of the present invention. The gate circuit 28 and the motor driving circuit 24 correspond to an example of a drive circuit of the present invention. The torque setting switch 36 corresponds to an example of a torque setting portion of the present invention.

In addition, the controller 40 serves as an example of a current threshold setting unit, an example of a control unit, and an example of a duty ratio setting unit of the present invention. In other words, the function of the current threshold setting unit of the present invention, is implemented by the threshold setting process executed in the controller 40, the function of the duty ratio setting unit is implemented by the duty ratio setting process executed in the controller 40, the function of the control unit is implemented by the motor drive process executed in the controller 40.

In the above, one embodiment of the present invention has been described. However, the present invention is not limited to the above described embodiment, and can take various modes without departing from the spirit of the invention.

For example, in the above-described embodiment, when the output duty ratio reaches the target duty ratio in the duty ratio setting process, the output duty ratio is then set to the target duty ratio. If the trigger pulling amount does not change, the motor 20 is controlled by the constant output duty ratio (=target duty ratio).

Figure 9:
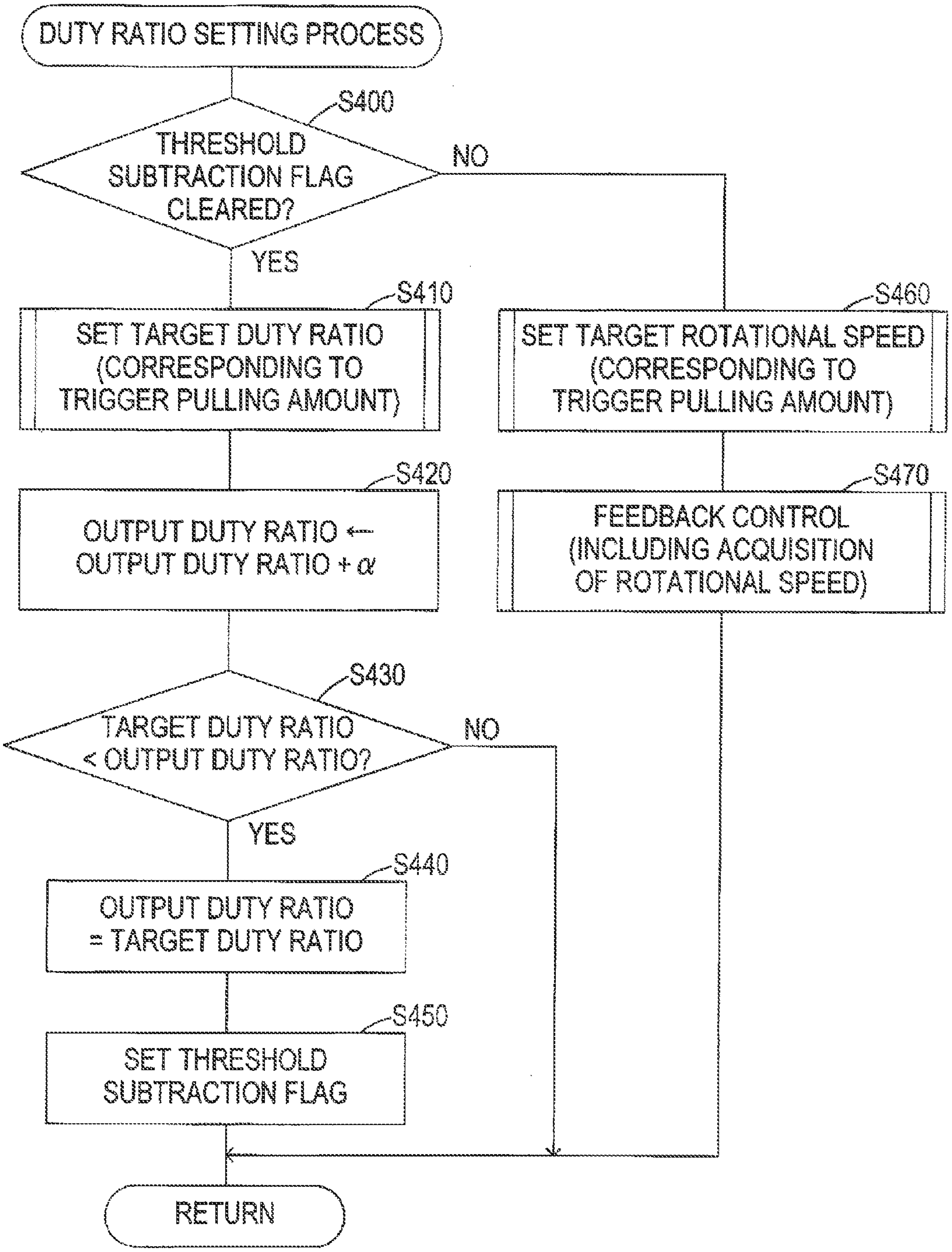
FIG. 9 is a flowchart showing a variation of the duty ratio setting process.

However, as shown in FIG. 9, when the output duty ratio reaches the target duty ratio in the duty ratio setting process, the steps of S460 and S470 may be then executed, so that the rotational speed of the motor 20 may be controlled to a target rotational speed which corresponds to the trigger pulling amount.

Particularly, in the duty ratio setting process shown in FIG. 9, it is determined in S400 whether or not the threshold subtraction flag is cleared. If the threshold subtraction flag is cleared, the steps from S410 to S450 are executed, in the same way as the duty ratio setting process in FIG. 4.

On the other hand, if it is determined in S400 that the threshold subtraction flag is not cleared (in other words, the flag is set), the process proceeds to S460 since the output duty ratio have reached the target duty ratio. Based on the trigger pulling amount, the target rotational speed of the motor 20 is set.

Then, in subsequent S470, a feedback control is performed in which the rotational speed of the motor 20 is detected via the rotational position sensor 22 and the output duty ratio is increased or decreased so that the rotational speed of the motor 20 becomes the target rotational speed.

If the duty ratio setting process is executed in this way, the rotational speed of the motor 20 (and the rotational shaft) can be controlled to a constant speed which corresponds to the trigger pulling amount. Usability can be improved.

Next, in the above embodiment, the controller 40 is configured as a microcomputer, but may be configured as a programmable logic device such as, for example, ASIC (Application Specific Integrated Circuits), FPGA (Field Programmable Gate Array), and so on.

In addition, the above control process executed by the controller 40 is implemented by executing a program by the CPU constituting the controller 40. This program may be written in a memory (such as a ROM 402) inside the controller 40, or may be recorded on a recording medium of which data can be read by the controller 40. As the recording medium, a portable semiconductor memory (for example, USB memory, memory card, etc.) can be used.

In addition, in the above embodiment, the motor 20 is described as a three-phase brushless DC motor. The motor 20 can be any motor as long as the motor can rotationally drive the rotational shaft which mounts a tool element.

What is claimed is:

1. An electric power tool comprising:

a motor configured to rotationally drive a rotational shaft, on which a tool element can be mounted;

a current detection unit configured to detect a motor current flowing through the motor;

an operating portion that is operated to input a command that is used to cause the motor to operate, the operating portion configured to be operated a varied amount proportional to a desired speed of the motor;

a torque setting portion configured to set a torque in accordance with one of a plurality of predetermined torque settings;

a current threshold setting unit that sets a current threshold, which is an upper limit of the motor current, based at least in part on the set torque; and a control unit that drives the motor in accordance with the varied amount of operation of the operating portion, and stops driving of the motor when the motor current detected by the current detection unit reaches the current threshold set by the current threshold setting unit, wherein the current threshold setting unit sets the current threshold, after the control unit has started driving of the motor, such that (i) the current threshold is set to a first value when a predetermined first period of time elapses after the control unit has started driving of the motor, (ii) the current threshold subsequently decreases from the first value so that the current threshold reaches to a constant value when a predetermined second period of time elapses after the control unit has started driving of the motor, and, (iii) the current threshold is maintained at a fixed value of the constant value after the current threshold is decreased to the constant value, the first value being larger than the constant value and the constant value corresponding to the set torque.

2. The electric power tool according to claim 1, wherein the current threshold setting unit sets the current threshold in such a manner that a maximum value of the current threshold is larger than the constant value until the predetermined period of time elapses.

3. The electric power tool according to claim 2, wherein the control unit includes:

a drive circuit that drives a switching element provided in a current-carrying path to the motor to rotate the motor; and a duty ratio setting unit that, when the operating portion is operated, sets a target duty ratio in accordance with the amount of operation, and gradually increases up to the target duty ratio a drive duty ratio used by the drive circuit to drive the switching element, wherein the current threshold setting unit, when the drive duty ratio set by the duty ratio setting unit is increasing toward the target duty ratio, gradually increases the current threshold.

4. The electric power tool according to claim 3, wherein the drive duty ration increases at a rate of change per unit time based at least in part on the set torque.

5. The electric power tool according to claim 3, wherein the current threshold setting unit, when the drive duty ratio set by the duty ratio setting unit reaches the target duty ratio, gradually decreases the current threshold.

6. The electric power tool according to claim 5, wherein the current threshold setting unit, when the current threshold becomes equal to the constant value by gradually decreasing the current threshold, determines that the predetermined second period of time has elapsed and fixes the current threshold to the constant value.

7. The electric power tool according to claim 6, wherein the current threshold is gradually decreased at a rate of change per unit time that is based at least in part on the set torque.

8. The electric power tool according to claim 3, wherein the duty ratio setting unit, when the drive duty ratio reaches the target duty ratio, updates the drive duty ratio in such a manner that a rotational speed of the motor becomes a target rotational speed which is set in accordance with the amount of operation of the operating portion.

9. The electric power tool according to claim 1, wherein the current threshold setting unit varies a rate of change per unit time of the current threshold.

10. The electric power tool according to claim 9, wherein the rate of change per unit time of the current threshold is set to be larger as the set torque is larger, in accordance with the set torque set via the torque setting portion.

11. The electric power tool according to claim 1, wherein the current threshold setting unit, when the amount of operation of the operating portion increases, temporarily increases the current threshold by an amount based at least in part on the amount of operation of the operating portion.

12. The electric power tool according to claim 1, wherein the predetermined second period of time is a period of time from when the motor starts to be driven until when the motor current comes into a stable state.

13. The electric power tool according to claim 1, wherein the predetermined second period of time is a period of time from when the motor starts to be driven until when a rotation of the motor comes into a stable state.

14. The electric power tool according to claim 1, wherein the predetermined second period of time is a period of time from when the motor starts to be driven until when an operation amount of the operating portion is fixed.

15. The electric power tool according to claim 1, wherein the current threshold setting unit further sets the current threshold, such that the current threshold initially continues to increase to the first value after the control unit has started driving of the motor, and subsequently continues to decrease to the constant value.

16. An electric power tool comprising:

a motor configured to rotationally drive a rotational shaft on which a tool element can be mounted;

a current detection unit configured to detect a motor current flowing through the motor;

an operating portion configured to be operated to input a command for driving the motor;

a current threshold setting unit configured to set a current threshold which is an upper limit of the motor current, in accordance with a predetermined set torque; and a control unit configured to drive the motor in accordance with an amount of operation of the operating portion, and to stop driving of the motor when the motor current detected by the current detection unit reaches the current threshold set by the current threshold setting unit, wherein the current threshold setting unit is further configured to set the current threshold, after the control unit has started driving of the motor, such that (i) the current threshold is set to a first value when a predetermined first period of time elapses after the control unit has started driving of the motor, (ii) the current threshold subsequently decreases from the first value so that the current threshold reaches to a constant value when a predetermined second period of time elapses after the control unit has started driving of the motor, and (iii) the current threshold is maintained at a fixed value of the constant value after the current threshold is decreased to the constant value, the first value being larger than the constant value and the constant value corresponding to the set torque.

17. The electric power tool according to claim 16, wherein the predetermined second period of time is a period of time from when the motor starts to be driven until when the motor current comes into a stable state.

18. The electric power tool according to claim 16, wherein the predetermined second period of time is a period of time from when the motor starts to be driven until when a rotation of the motor comes into a stable state.

19. The electric power tool according to claim 16, wherein the predetermined second period of time is a period of time from when the motor starts to be driven until when an operation amount of the operating portion is fixed.

20. The electric power tool according to claim 16, wherein the current threshold setting unit is further configured to set the current threshold, such that the current threshold initially continues to increase to the first value after the control unit has started driving of the motor, and subsequently continues to decrease to the constant value.

* * * * *